United States Patent
Haener et al.

(10) Patent No.: US 10,664,761 B2
(45) Date of Patent: May 26, 2020

(54) GENERATING QUANTUM COMPUTING CIRCUITS BY DISTRIBUTING APPROXIMATION ERRORS IN A QUANTUM ALGORITHM

(71) Applicant: Microsoft Technology Licensing, LLC, Redmond, WA (US)

(72) Inventors: Thomas Haener, Zurich (CH); Martin H. Roetteler, Woodinville, WA (US); Krysta M. Svore, Seattle, WA (US); Vadym Kliuchnikov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 61 days.

(21) Appl. No.: 16/023,206

(22) Filed: Jun. 29, 2018

(65) Prior Publication Data

US 2019/0362270 A1 Nov. 28, 2019

Related U.S. Application Data

(60) Provisional application No. 62/676,519, filed on May 25, 2018.

(51) Int. Cl.
*G06N 10/00* (2019.01)
*G06F 30/30* (2020.01)

(52) U.S. Cl.
CPC ............. *G06N 10/00* (2019.01); *G06F 30/30* (2020.01)

(58) Field of Classification Search
USPC ........................................................ 716/101
See application file for complete search history.

(56) References Cited

U.S. PATENT DOCUMENTS

2015/0205759 A1\* 7/2015 Israel ..................... G06N 10/00
 703/2
2017/0194930 A1 7/2017 Wiebe et al.
(Continued)

FOREIGN PATENT DOCUMENTS

WO 2016200747 A1 12/2016

OTHER PUBLICATIONS

"International Search Report and Written Opinion Issued in PCT Application No. PCT/US2019/032759", dated Aug. 21, 2019, 14 Pages.

(Continued)

*Primary Examiner* — Mohammed Alam
(74) *Attorney, Agent, or Firm* — Ranjeev Singh; Singh Law, PLLC

(57) ABSTRACT

Methods for generating quantum computing circuits by distributing approximation errors in a quantum algorithm are described. A method includes decomposing a quantum algorithm into quantum circuits. The method includes using at least one processor, automatically performing a step-wise decomposition of the quantum algorithm until the quantum algorithm is fully decomposed into the quantum circuits, where the automatically performing the step-wise decomposition results in a set of approximation errors and a set of parameters to instantiate at least a subset of the quantum circuits corresponding to the quantum algorithm, such that an overall approximation error caused by the automatically performing the step-wise decomposition is maintained below a specified threshold approximation error.

20 Claims, 10 Drawing Sheets

(56) References Cited

U.S. PATENT DOCUMENTS

| | | | |
|---|---|---|---|
| 2017/0220948 A1 | 8/2017 | Bocharov et al. | |
| 2018/0144262 A1* | 5/2018 | Roetteler | G06F 17/10 |
| 2019/0042392 A1* | 2/2019 | Matsuura | G06N 10/00 |
| 2019/0318053 A1* | 10/2019 | Low | G06N 10/00 |

OTHER PUBLICATIONS

Kliuchnikov, Vadym, "New Methods for Quantum Compiling", A Thesis Submitted for the Fulfillment of the Requirements for the Degree of Doctor of Philosophy in Computer Science—Quantum Information, University of Waterloo, Apr. 30, 2014, 144 Pages.

Kliuchnikov, et al., "Practical Approximation of Single-qubit Unitaries by Single-qubit Quantum Clifford and T Circuits", In Journal of IEEE Transactions on Computers, vol. 65 Issue 1, Dec. 16, 2015, pp. 161-172.

Kais, Sabre, "Introduction to Quantum Information and Computation for Chemistry", In Journal of the Quantum Information and Computation for Chemistry, Advances in Chemical Physics, vol. 154, Feb. 14, 2014, 38 Pages.

Wiebe, et al., "Quantum Arithmetic and Numerical Analysis using Repeat-Until-Success Circuits", In Journal of the Quantum Information & Computation vol. 16 Issue 1-2, Jun. 19, 2014, 32 Pages.

Berry, et al., "Simulating Hamiltonian Dynamics with a Truncated Taylor Series", In Physical Review Letters, vol. 114, Issue 9, Mar. 3, 2015, 6 Pages.

Feynman, Richard P., "Simulating Physics with Computers", In International Journal of Theoretical Physics, vol. 21, Issue 6-7, Jun. 1, 1982, pp. 467-477.

Grover, Lov K., "A Fast Quantum Mechanical Algorithm for Database Search", In Proceedings of the twenty-eighth annual ACM symposium on Theory of computing, May 22, 1996, pp. 1-8.

Haner, et al. "A Software Methodology for Compiling Quantum Programs", In Journal of Quantum Science and Technology, vol. 3, Issue 2, Feb. 21, 2018, pp. 1-14.

Haner, et al., "Managing Approximation Errors in Quantum Programs", In ACM Transactions on Programming Languages and Systems, vol. 9, Issue 4, Mar. 2010, 9 Pages.

Kliuchnikov, et al., "Fast and Efficient Exact Synthesis of Single Qubit Unitaries Generated by Clifford and T gates", In Journal of Quantum Information & Computation, vol. 13, Nos. 7-8, Jun. 2013, pp. 1-23.

Nielsen, et al., "Quantum Computation and Quantum Information", In Publication of Cambridge University Press, 2002, 8 Pages.

Ross, et al., "Optimal Ancilla-free Clifford T Approximation of Z-Rotations", In Journal of Computing Research Repository, Mar. 2014, pp. 1-40.

Shor, Peter W., "Algorithms for Quantum Computation: Discrete Logarithms and Factoring", In Proceedings of 35th Annual Symposium on Foundations of Computer Science, Nov. 20, 1994, pp. 124-134.

Steiger, et al., "ProjectQ an Open Source Software Framework for Quantum Computing", In Journal of Quantum, vol. 2, Issue 49, Jan. 31, 2018, pp. 1-11.

Wecker, et al., "Gate-Count Estimates for Performing Quantum Chemistry on Small Quantum Computers", In Journal of Physical Review A, vol. 90, Issue 2, Aug. 2014, pp. 1-15.

* cited by examiner

GENERATING QUANTUM COMPUTING CIRCUITS BY DISTRIBUTING APPROXIMATION ERRORS IN A QUANTUM ALGORITHM

CROSS-REFERENCE TO A RELATED APPLICATION

This application claims the benefit of U.S. Provisional Application No. 62/676,519, filed May 25, 2018, titled "GENERATING QUANTUM COMPUTING CIRCUITS BY DISTRIBUTING APPROXIMATION ERRORS IN A QUANTUM ALGORITHM," the entire contents of which are hereby incorporated herein by reference.

BACKGROUND

Quantum computing may solve certain problems much faster than classical devices. Examples of such problems include Shor's algorithm, unstructured search problems, and simulation of quantum mechanical systems.

Advances in quantum algorithms that offer speed-up over classical devices have been described at a very high-level of abstraction, and practical estimates of quantum circuits or other resources needed to perform quantum algorithms have not been provided. To estimate the required resources for a given quantum algorithm, the high-level representation of the quantum algorithm needs to be translated (or compiled) to a low-level set of operations that can be realized using standard gate sets, such as the Clifford+T gate set. In addition, to ensure that the resulting low-level set of operations perform the quantum algorithm within a certain specified tolerance, the errors generated during the translation or compilation of the algorithm need to be managed.

SUMMARY

In one example, the present disclosure relates to a method for decomposing a quantum algorithm into quantum circuits. The method may include using at least one processor, automatically performing a step-wise decomposition of the quantum algorithm until the quantum algorithm is fully decomposed into the quantum circuits, where the automatically performing the step-wise decomposition results in a set of approximation errors and a set of parameters to instantiate at least a subset of the quantum circuits corresponding to the quantum algorithm, such that an overall approximation error caused by the automatically performing the step-wise decomposition is maintained below a specified threshold approximation error.

In another example, the present disclosure relates to a method for decomposing a quantum algorithm into quantum circuits. The method may include using at least one processor, automatically performing a step-wise decomposition of the quantum algorithm and distributing an overall approximation error caused by the automatically performing the step-wise decomposition into subroutines until the quantum algorithm is fully decomposed into the quantum circuits. The method may further include using the at least one processor, minimizing a cost metric associated with implementing the quantum circuits while maintaining the overall approximation error below a specified threshold approximation error.

In yet another example, the present disclosure relates to a computer-readable medium comprising computer executable instructions for a method. The method may include using at least one processor, automatically performing a step-wise decomposition of the quantum algorithm and distributing an overall approximation error caused by the automatically performing the step-wise decomposition into subroutines until the quantum algorithm is fully decomposed into the quantum circuits, where the step-wise decomposition into the subroutines is implemented via a quantum phase estimation (QPE) process. The method may further include using the at least one processor, minimizing a cost metric associated with implementing the quantum circuits while maintaining the overall approximation error below a specified threshold approximation error.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
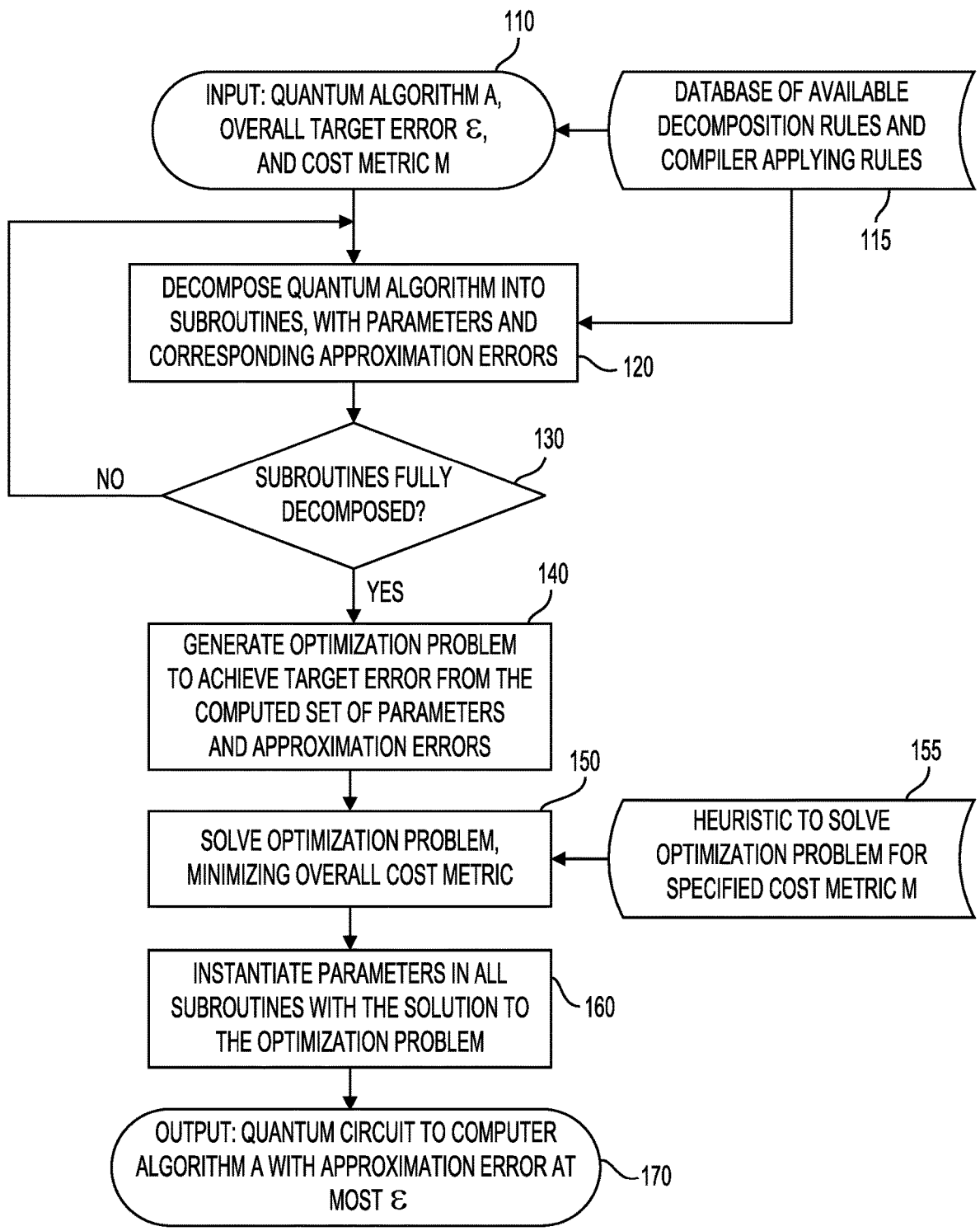
FIG. 1 shows a flow chart of a method for distributing approximation errors as part of generating quantum circuits corresponding to a quantum algorithm in accordance with one example.

Examples described in this disclosure relate to generating quantum computing circuits by distributing approximation errors in a quantum algorithm. As the field of quantum computing approaches a state where thousands of operations can be carried out on tens and soon even hundreds of qubits, a supporting software stack is required. When compiling algorithms for fault-tolerant quantum computing, some operations must be approximated while keeping the overall error beneath a user or application-defined threshold. As a result, several choices for distributing the error among subroutines emerge; the goal is to choose a good, or even the best, one. To this end, the present disclosure describes an error management module which can be integrated into any quantum software framework.

The job of a quantum program compiler is to translate a high-level description of a given quantum program to hardware-specific machine-level instructions. During the compilation process, one of the requirements may be to optimize as much as possible in order to reduce the overall depth of the resulting circuit to keep the overhead of the required quantum error correction manageable. Optimizations include quantum versions of constant-folding (such as merging consecutive rotation gates, or even additions by constants) and recognition of compute/action/uncompute sections to reduce the number of controlled gates. To allow such optimizations, multiple layers of abstractions may be used instead of compiling directly down to low-level machine instructions, which would make it impossible to recognize, e.g., two consecutive additions by constants. As an example, even canceling a gate followed by its inverse becomes computationally hard, or even impossible once continuous gates have been approximated.

To translate an intermediate representation to the next lower level of abstraction, a set of decomposition rules is used, some of which introduce additional errors which can be made arbitrarily small at the cost of an increasing circuit size or depth, which in turn implies a larger overhead when applying quantum error correction. It is therefore of great interest to choose these error tolerances such that the computation succeeds with high probability given the available resources (number and quality of qubits). At each level of abstraction, the compiler introduces additional accuracy parameters which must be chosen such that: (1) the cost to implement subroutines is automatically computed as a function of precision, (2) the overall error lies within the specifications of the algorithm, and (3) the implementation cost is as low as possible while the first constraint is satisfied.

One example solution manages these two constraints by expressing the final cost metric, which in one example is the total number of elementary quantum gates used, in terms of the costs of implementing all of its different subroutines. These subroutine costs are first assumed to be parameters, leading to an (in general, non-convex) optimization problem when trying to minimize the overall metric, while still guaranteeing a given overall approximation error. In an example implementation, the optimization problem is solved by using simulated annealing, starting from an initially random assignment of parameters.

While it is not possible to perform error correction over a continuous set of quantum operations (gates), this can be achieved over a discrete gate set such as the aforementioned Clifford+T gate set. As a consequence, certain operations must be approximated using gates from this discrete set. An example is the operation which achieves a rotation around the z-axis, $$Rz_\theta = \begin{pmatrix} e^{-i\theta/2} & 0 \\ 0 & e^{i\theta/2} \end{pmatrix}.$$

To implement such a gate over Clifford+T, synthesis algorithms can be used. Given the angle θ of this gate, such a rotation synthesis algorithm will produce a sequence of $\mathcal{O}(\log \varepsilon_R^{-1})$ Clifford+T gates which approximate $Rz_\Theta$ up to a given tolerance $\varepsilon_R$. In most error correction protocols, the T-gate is the most expensive operation to realize, as it cannot be executed natively but requires a distillation protocol to distill many noisy magic states into one good state, which can then be used to apply the gate. As a consequence, it may be advantageous to reduce the number of these T-gates as much as possible in order to allow executing a certain quantum computation.

As described, the job of a quantum program compiler is to translate a high-level description of a given quantum program to hardware-specific machine-level instructions. As in classical computing, such compilation frameworks can be implemented in a hardware-agnostic fashion by introducing backend-independent intermediate representations of the quantum code.

During the compilation process, it is useful to optimize as much as possible in order to reduce the overall depth of the resulting circuit to keep the overhead of the required quantum error correction manageable. Optimizations include quantum versions of constant-folding (such as merging consecutive rotation gates, or even additions by constants) and recognition of compute/action/uncompute sections to reduce the number of controlled gates. To allow such optimizations, it may be advantageous to introduce multiple layers of abstractions instead of compiling directly down to low-level machine instructions, which may make it impossible to recognize, e.g., two consecutive additions by constants. This is because even canceling a gate followed by its inverse becomes computationally hard once continuous gates have been approximated.

To translate an intermediate representation to the next lower level of abstraction, a set of decomposition rules is used, some of which introduce additional errors which can be made arbitrarily small at the cost of an increasing circuit size or depth, which in turn implies a larger overhead when applying quantum error correction.

FIG. 1 shows a flow chart of a method for distributing approximation errors as part of generating quantum circuits corresponding to a quantum algorithm. In this example, the method is described using a framework for determining the total error from the decomposition of a quantum algorithm into lower-level gates by estimating the individual errors ϵ of the lower-level gates.

In one example, the time-evolution of a closed quantum system can be described by a unitary operator. As a consequence, each time-step of an example quantum computer can be described by a unitary matrix of dimension $2^n \times 2^n$ (excluding measurement), where n denotes the number of quantum bits (qubits). When decomposing such a quantum operation U into a sequence of lower-level operations $U_M \ldots U_1$, the resulting total error can be estimated from the individual errors ε of the lower-level gates using the following Lemma 1. Given a unitary decomposition of U such that $U = U_M \cdot U_{M-1} \ldots U_1$ and unitaries $V_i$ which approximate the unitary operators $U_i$ such that $\|V_i - U_i\| < \varepsilon_i$ ∀i, the total error can be bounded as follows:

$$\|U - V_M \ldots V_1\| \leq \sum_{i=1}^{M} \varepsilon_i.$$

The proof of Lemma 1 is by induction using the triangle inequality and submultiplicativity of $\|\cdot\|$ with $\|U\|\leq 1$. The base case M=2 can be proven as follows:

$$\|U_2 U_1 - V_2 V_1\| = \|U_2 U_1 - U_2 V_1 + U_2 V_1 - V_2 V_1\| \leq \|U_2(U_1 - V_1)\| + \|(U_2 - V_2) V_1\| \leq \varepsilon_1 + \varepsilon_2.$$

The induction step $P(M-1) \rightarrow P(M)$ can be shown in a similar fashion:

$$\|U_M \ldots U_1 - V_M \ldots V_1\| =$$
$$\|U_M \ldots U_1 - U_M \ldots U_2 V_1 + U_M \ldots U_2 V_1 - V_M \ldots V_1\| \leq$$
$$\|U_M \ldots U_2(U_1 - V_1)\| + \|(U_M \ldots U_2 - V_M \ldots V_2) V_1\| \leq$$
$$\varepsilon_1 + \sum_{i=2}^{M} \varepsilon_i = \sum_{i=1}^{M} \varepsilon_i.$$

Note that this also holds for subunitaries $\tilde{V}_i$, meaning that $\|\tilde{V}_i\| \leq 1$. Therefore, in this example, one can safely ignore measurement and the resulting overall error can only be smaller than estimated. In addition, measurements are rare operations and as such, the effect of this approximation on the choice of the individual $\varepsilon_i$ is minor.

Using only Lemma 1 in the compilation process to automatically optimize the individual $\varepsilon_i$ would make the resulting optimization problem infeasibly large. In addition, the number of parameters to optimize would vary throughout the optimization process since the number of lower-level gates changes when implementing a higher-level operation at a different accuracy, which in turn changes the number of distinct $\varepsilon_i$. To address these two issues, Theorem 4, which generalizes Lemma 1, is introduced. First, a few definitions concerning the Theorem 4 are provided.

Definition 1: Let $V_{M(\varepsilon)} \ldots V_1$ be an approximate decomposition of the target unitary U such that $\|V_{M(\varepsilon)} \ldots V_1\| \leq \varepsilon$. A set of subroutine sets $\mathcal{S}(U, \varepsilon) = \{S_1, \ldots, S_K\}$ is a partitioning of subroutines of U if $\forall i \exists! k: V_i \in S_k$ and we denote by S(V) the function which returns the subroutine set S such that $V \in S$.

Such a partitioning will be used to assign to each $V_i$ the accuracy $\varepsilon_{S(V_i)} = \varepsilon_{S_k}$ with which all $V_i \in S_k$ are implemented. In order to decompose the cost of U, however, we also need the notion of a cost-respecting partitioning of subroutines of U and the costs of its subsets: Definition 2: Let $\mathcal{S}(U, \varepsilon) = \{S_1, \ldots, S_K\}$ be a set of subroutine sets. $\mathcal{S}(U, \varepsilon)$ is a cost-respecting partitioning of subroutines of U w.r.t. a given cost measure $C(U, \varepsilon)$ if $\forall \varepsilon, i, j, k: (V_i \in S_k \wedge V_j \in S_k \Rightarrow C(V_i, \varepsilon) = C(V_j, \varepsilon))$. The cost of a subroutine set S is then well-defined and given by $C(S, \varepsilon) := C(V, \varepsilon)$ for any $V \in S$.

With these definitions in place, one can now generalize Lemma 1. Theorem 4: Let $\mathcal{S}(U, \varepsilon) = \{S_1, \ldots, S_K\}$ be a cost-respecting partitioning of subroutines for a given decomposition of U w.r.t. the cost measure $C(U, \varepsilon)$ denoting the number of elementary gates required to implement U. Then the cost of U can be expressed in terms of the costs of all subroutine sets $S \in \mathcal{S}(U, \varepsilon_U)$ as follows $$C(U, \varepsilon) = \sum_{S \in \mathcal{S}(U, \varepsilon_U)} C(S, \varepsilon_S) f_S(\varepsilon_U) \text{ with}$$

-continued
$$\sum_{S \in \mathcal{S}(U, \varepsilon_U)} \varepsilon_S f_S(\varepsilon_U) \leq \varepsilon - \varepsilon_U,$$

where $f_S(\varepsilon_U)$ gives the number of subroutines in the decomposition of U that are in S, given that the decomposition of U would introduce error $\varepsilon_U$ if all subroutines were to be implemented exactly and $\varepsilon_S$ denotes the error in implementing subroutines that are in S.

In this example, the cost $C(U, \varepsilon)$ can be decomposed into a sum of the costs of all subroutines $V_i$. Furthermore, since $\varepsilon_{V_i} = \varepsilon_S \ \forall V \in S$, $$C(U, \varepsilon) = \sum_i C(V_i, \varepsilon_{V_i}) = \sum_i C(V_i, \varepsilon_{S(V_i)}) = \sum_{S \in \mathcal{S}} |\{i: V_i \in S\}| C(S, \varepsilon_S)$$

and $f_S(\varepsilon_U) := |\{i: V_i \in S\}| \ \forall S \in \mathcal{S}(U, \varepsilon_U)$.

To prove that the overall error remains bounded by $\varepsilon$, let $\tilde{U}$ denote the unitary which is obtained by applying the decomposition rule for U with accuracy $\varepsilon_U$, i.e., $\|U - \tilde{U}\| \leq \varepsilon_U$ (where all subroutines are implemented exactly). Furthermore, let V denote the unitary which will ultimately be executed by the quantum computer, i.e., the unitary which is obtained after all decomposition rules and approximations have been applied. By the triangle inequality and Lemma 1, $$\|U - V\| \leq \|U - \tilde{U}\| + \|\tilde{U} - V\| \leq \varepsilon_U + \sum_{S \in \mathcal{S}(U, \varepsilon_U)} \varepsilon_S f_S(\varepsilon_U) \leq \varepsilon.$$

Figure 4:
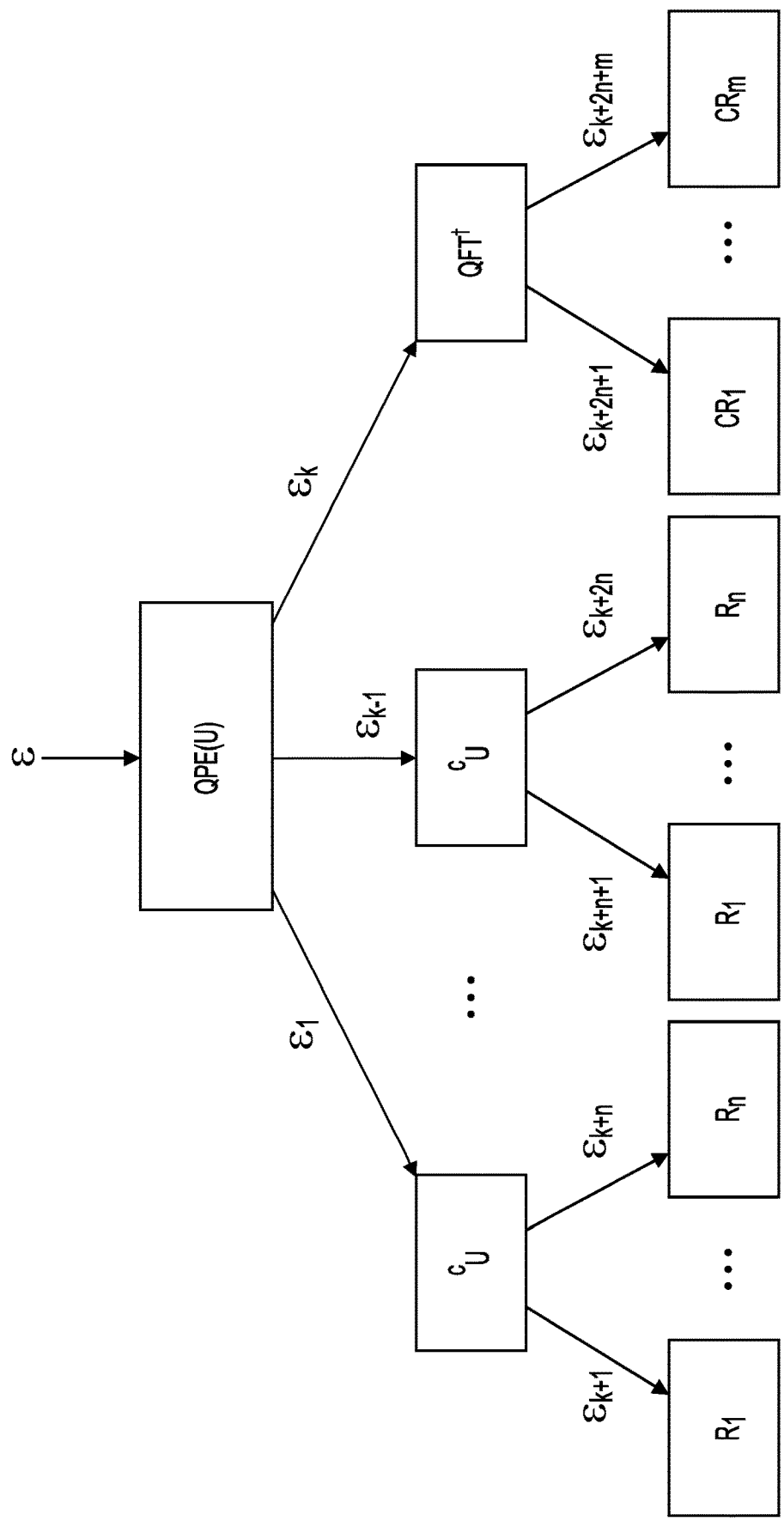
FIG. 4 is an abstract depiction of the compilation process for a quantum phase estimation (QPE) applied to a given unitary U in accordance with one example.

FIG. 4 is an abstract depiction of the compilation process for a quantum phase estimation (QPE) applied to a given unitary U in accordance with one example. In FIG. 4, for example, the left-most $^cU$ box gets $\varepsilon_1$ as its error budget. Depending on the implementation details of $^cU$, some of this budget may already be used to decompose $^cU$ into its subroutines, even assuming that all subroutines of $^cU$ are implemented exactly. The remaining error budget is then distributed among its subroutines, which is exactly the statement of the above theorem. The decomposition of the cost can be performed at different levels of granularity. This translates into having a larger set $\mathcal{S}(U, \varepsilon)$ and more functions $f_S(\varepsilon_U)$ that are equal to 1. The two extreme cases are:

1. $f_S(\varepsilon) = 1 \ \forall S \in \mathcal{S}(U, \varepsilon)$, $|\mathcal{S}(U, \varepsilon)| = \#$gates needed to implement U:
   A different $\varepsilon_U$ for each gate 2. $f_S(\varepsilon) = \#$gates needed to implement U $\forall S \in \mathcal{S}(U, \varepsilon)$, $|S(U, \varepsilon)| = 1$:
   The same $\varepsilon_\Theta$ for all gates Therefore, this solves the first issue of Lemma 1: In a practical implementation, the size of the set $\mathcal{S}(U, \varepsilon)$ can be adaptively chosen such that the resulting optimization problem which is of the form $$\left(\varepsilon_{S_1}^*, \ldots, \varepsilon_{S_N}^*\right) \in$$
$$\arg\min C \text{ Program}(\varepsilon_{S_1}, \ldots, \varepsilon_{S_N}) \text{ such that } \varepsilon_{Program}\left(\varepsilon_{S_1}^*, \ldots, \varepsilon_{S_N}^*\right) \leq \varepsilon$$

for a user-defined or application-defined over-all tolerance $\varepsilon$, can be solved using a reasonable amount of resources.

Moreover, the costs of optimization can be reduced by initializing the initial trial parameters $\varepsilon_{S_j}$ to the corresponding solution accuracies of a lower-dimensional optimization problem where $\mathcal{S}(U, \varepsilon)$ had fewer distinct subroutines. This example approach is very similar to multi-grid schemes which are used to solve partial differential equations.

The second issue with a direct application of Lemma 1 is the varying number of optimization parameters, which is also resolved by Theorem 4. Of course, one can simply make $\mathcal{S}(U, \varepsilon)$ tremendously large such that most of the corresponding $f_S(\varepsilon)$ are zero. This, however, is a rather inefficient solution which would also be possible when using Lemma 1 directly.

A better approach may be to inspect $\mathcal{S}(U, \varepsilon)$ for different values of $\varepsilon$ and to then choose A auxiliary subroutine sets $S_1^a, \ldots, S_A^a$ such that each additional subroutine $V_k^a$ which appears when changing $\varepsilon$ (but is not a member of any S of the original $\mathcal{S}(U, \varepsilon)$) falls into exactly one of these sets.

The original set $\mathcal{S}(U, \varepsilon)$ can then be extended by these auxiliary sets before running the optimization procedure. Again, the level of granularity of these auxiliary sets and thus the number of such sets A can be tuned according to the resources that are available to solve the resulting optimization problem.

Figure 2:
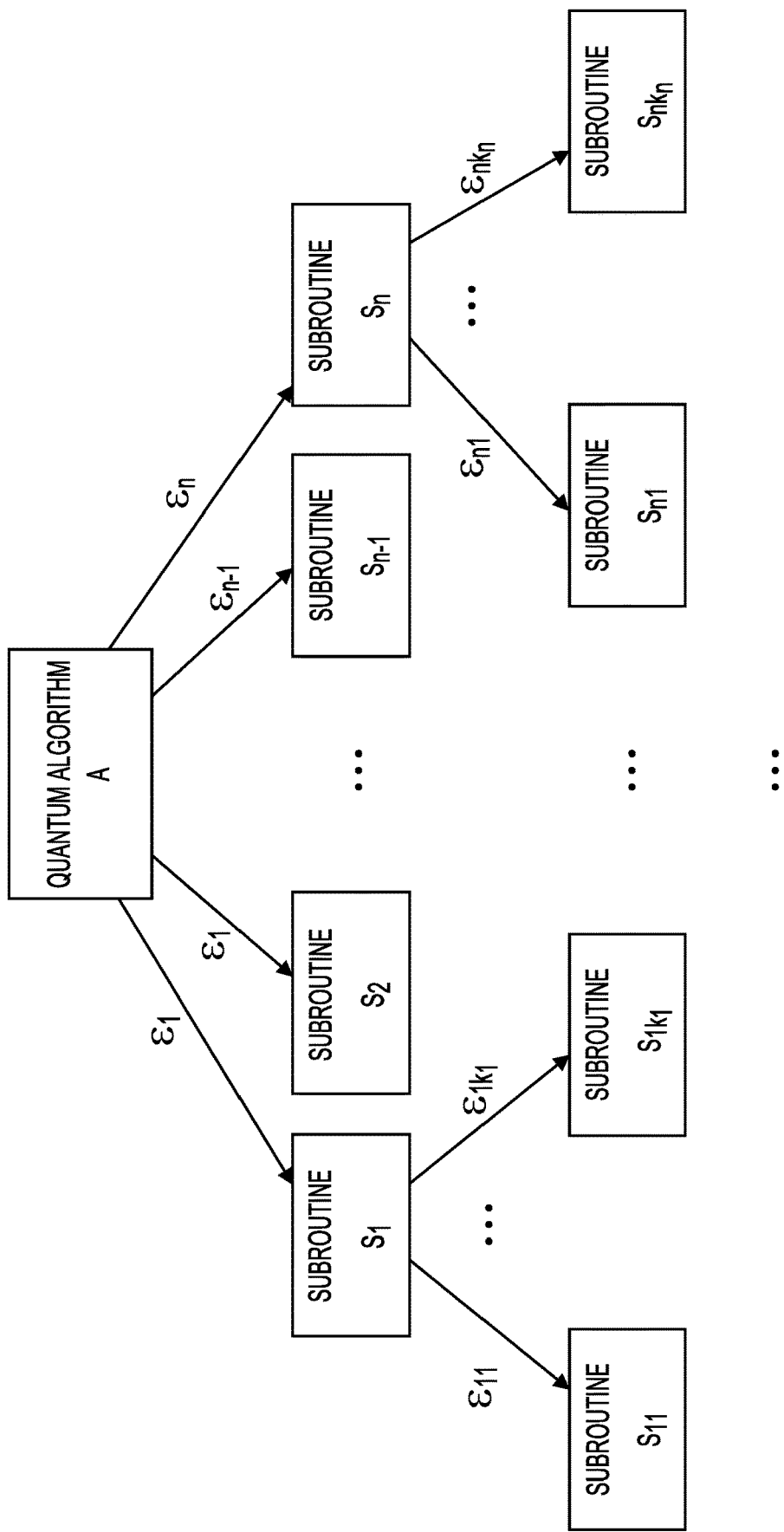
FIG. 2 shows a diagram of a decomposition of a quantum algorithm into subroutines $S_1, S_2, \ldots S_n$ with an approximation error of $\epsilon_1, \epsilon_2, \ldots \epsilon_n$, respectively in accordance with one example.

In step 110, inputs related to a quantum algorithm A, overall target error $\varepsilon$, and cost metric M may be received. As part of this step, the system may also access a database of available decomposition rules and compiler applying rules 115. Next, in step 120, the system may decompose the quantum algorithm into subroutines, with parameters and corresponding approximation errors. As an example, the quantum algorithm may be decomposed using the Trotter decomposition process. Alternatively, an approach based on truncated Taylor series may also be used for the decomposition process. As an example, as shown in FIG. 2, quantum algorithm A may be decomposed into subroutines $S_1$, $S_2$, ... $S_n$ with an approximation error of $\epsilon_1, \epsilon_2, \ldots \epsilon_n$, respectively. This example schema involves decomposing the top-level algorithm A into subroutines with a list of resulting approximation errors. As further shown in FIG. 2, each of the subroutines $S_1, S_2, \ldots S_n$ may be further decomposed into additional subroutines and concomitant approximation errors.

One example of decomposing a quantum algorithm includes the decomposition of the transverse field Ising model into subroutines. Thus, as shown in FIG. 4, as part of the decomposition step (e.g., step 120 of FIG. 1), the top-level quantum phase estimation (QPE) is decomposed into several applications of a controlled unitary operator (U) and the inverse of a quantum Fourier transform (QFT). Subsequently, the controlled-U blocks are further decomposed into rotations $R_1, R_2 \ldots R_n$, as shown in FIG. 4.

Figure 5:
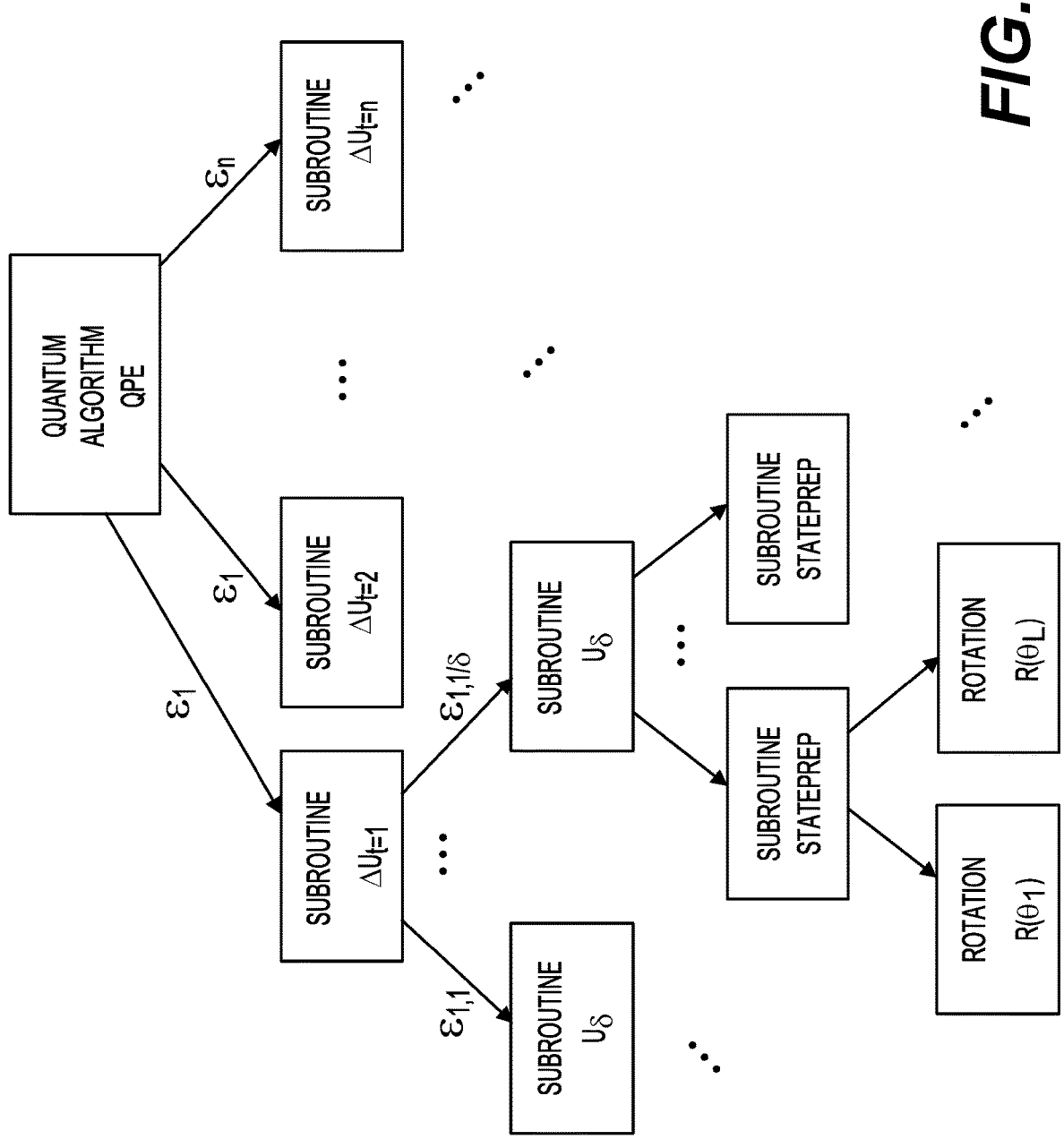
FIG. 5 shows a diagram of an example of a schema that tracks the lists of approximation errors when recursively decomposing a top-level quantum algorithm.

Another example of a schema that tracks the lists of approximation errors when recursively decomposing a top-level quantum algorithm, where the top-level quantum algorithm is a linear combination of unitaries is shown in FIG. 5. In a first decomposition step, the top-level quantum phase estimation (QPE) is decomposed into several time steps. Each time step is approximated by a subroutine U$\delta$ and in turn each of these is implemented by a state preparation circuit StatePrep. Finally, each state preparation is implemented by a sequence of rotations $R(\theta_1), R(\theta_2), \ldots R(\theta_L)$.

Next, in step 130, the system may determine whether the subroutines comprising the quantum algorithm A have been fully decomposed. If not, then the system may continue to iterate until the subroutines have been fully decomposed.

Next, in step 140, the system may generate the optimization problem to achieve the target error $\varepsilon$ from the computed set of parameters and the approximation errors.

Next, in step 150, the system may solve the optimization problem by minimizing the cost metric M. As part of this step, the system may obtain a heuristic to solve the optimization problem for the specified cost metric M 155. In one example, the heuristic may be simulated annealing. In one example, the optimization problem may be solved in two steps or modes. The first mode may be active whenever the current overall error is larger than the target accuracy $\varepsilon$. In this mode, the system may perform annealing until the target accuracy has been reached. At this point, the second mode may become active. In the second mode, the system may perform annealing-based optimization to reduce the circuit cost function. After each such step, the system may switch back to the error-reduction mode if the overall error increased above the target accuracy $\varepsilon$. Table 1 below provides a high-level description of an example annealing-based algorithm to solve the optimization problem as part of step 150.

TABLE 1

```
β = 0
ε̄ = (0.1,0.1,...,0.1)
cost = get_cost(ε̄)
error = get_total_error(ε̄)
for step in range(num_steps):
            i = floor( rnd( ) * len( eps ) )
            old_ε̄ = ε̄
            if rnd( ) < 0.5:
                 ε̄_i *= 1 + (1 – rnd( ) ) * δ
            else:
                 ε̄_i /= 1 + (1 – rnd( ) ) * δ
      if error <= goal_error:
          # reduce cost
          ΔE = get_cost(ε̄) – cost
      else:
          # reduce error
          ΔE = get_total_error(ε̄) – error
      paccept = min(1 , e–βΔE)
      if rnd ( )> paccept :
          ε̄ = old_ε̄
      β += Δ β
```

Next, in step 160, the system may instantiate parameters in all subroutines with the solution to the optimization problem. In a preferred embodiment, the subroutines are unitary operations, each of which depends on one parameter or a limited number of parameters and each of which operates on a limited number of qubits. The solution computed in step 150 using heuristic 155 is then a setting of said parameters to specific values which commonly are real numbers in some interval. In another embodiment, the subroutines can involve unitary operations that depend on several parameters and which operate on a growing number of qubits. Examples for such embodiments include, but are not restricted to, reflection operation around states that are modeled parametrically. Other examples for such embodiments include rotations on subspaces, where the rotation angles are parameters. Other examples for such embodiments include single qubit unitary rotations and controlled single qubit unitary rotations.

Finally, in step 170, after the parameters have been used in step 160 to determine concrete unitary operations over the complex numbers. Doing so will set all subroutines to specific unitary operations that do no longer depend on parameters and which can then be implemented by a quantum computer hardware. The collection of subroutines will then be assembled into one program which is a quantum circuit for the instruction-level representation of the algorithm A. The system may then output at least one quantum circuit to compute the algorithm A with the approximation error of at most ε and execute said circuit on a target quantum computer.

Figure 3:
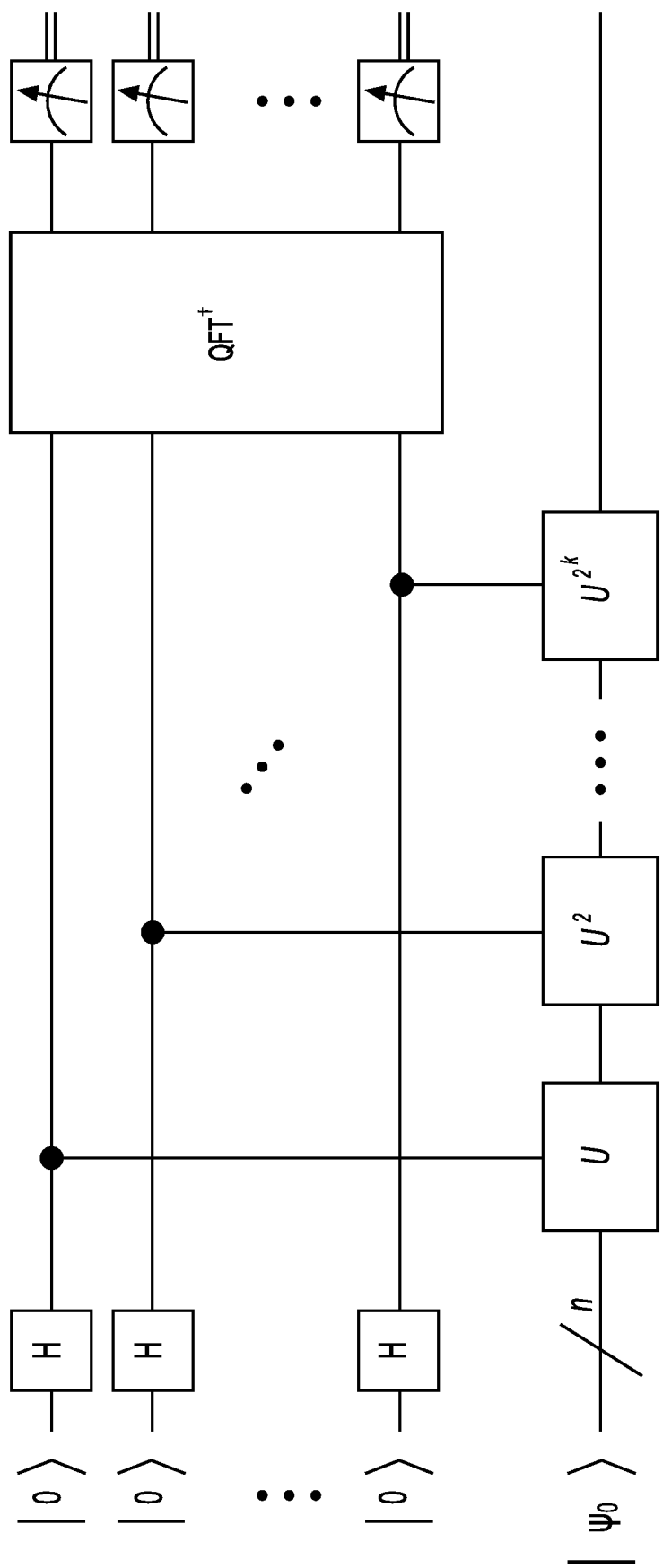
FIG. 3 shows a quantum circuit of a quantum phase estimation applied to a time evolution operator $U=e^{-itH}$, where H is the Hamiltonian of the quantum system being simulated, in accordance with one example.

FIG. 3 shows a quantum circuit of a quantum phase estimation applied to a time evolution operator $U=e^{-itH}$, where H is the Hamiltonian of the quantum system being simulated. In this example, after the inverse quantum Fourier transform (QFT), a measurement yields the phase which was picked up by the input state. For the ground state $\psi_0$, this is $U\psi_0 = e^{-iHt}\psi_0 = e^{-iE_0 t}\psi_0$, allowing the extraction of the energy $E_0$ of $\psi_0$. As an example, the simulation of a quantum mechanical system called the transverse-field Ising model (TFIM), which is governed by the Hamiltonian shown below, is described.

$$\hat{H} = -\sum_{\langle i,j \rangle} J_{ij} \sigma_z^i \sigma_z^j - \sum_i \Gamma_i \sigma_x^i,$$

where $J_{ij}$ are coupling constants and $\Gamma_i$ denotes the strength of the transverse field at location i. $\sigma_x^i$ and $\sigma_z^i$ are the Pauli matrices, i.e., $$\sigma_x = \begin{pmatrix} 0 & 1 \\ 1 & 0 \end{pmatrix} \text{ and } \sigma_z = \begin{pmatrix} 1 & 0 \\ 0 & -1 \end{pmatrix}$$

acting on the i-th spin.

The sum over $\langle i,j \rangle$ loops over all pairs of sites (i,j) which are connected. In this example, this corresponds to nearest-neighbor sites on a one-dimensional spin chain (with periodic boundary conditions) of length N. Given an approximation $\tilde{\psi}_0$ to the ground state $\psi_0$ of $\hat{H}$, the ground state energy $E_0$ may be determined such that $\hat{H}\psi_0 = E_0 \psi_0$.

In this example, quantum phase estimation (QPE) can be used to achieve this task: If the overlap between $\psi_0$ and $\tilde{\psi}_0$ is large, a successful application of QPE followed by a measurement of the energy register will collapse the state vector onto $\psi_0$ and output $E_0$ with high probability (namely $p=|\tilde{\psi}_0|\psi_0|^2$). There are various ways to implement QPE, but the simplest to analyze is the coherent QPE followed by a measurement of all control qubits. FIG. 3 shows a diagram of an example quantum circuit.

This procedure requires $16\pi/\varepsilon_{QPE}$ applications of (the controlled version of) the time-evolution operator $U_\delta = \exp(-i\delta\hat{H})$ for a success probability of ½, where $\varepsilon_{QPE}$ denotes the desired accuracy (bit-resolution of the resulting eigenvalues). Using a Trotter decomposition of $U_\delta$, i.e., for large M $$U_\delta \approx \left( U_{\frac{J}{M}}^J U_{\frac{\Gamma}{M}}^\Gamma \right)^M = \left( \exp\left(-i\frac{\delta}{M}\sum_i J_{i,i+1}\sigma_z^i\sigma_z^{i+1}\right) \exp\left(-i\frac{\delta}{M}\sum_i \Gamma_i \sigma_x^i\right) \right)^M =$$

$$\left( \prod_i \exp\left(-i\frac{\delta}{M}J_{i,i+1}\sigma_z^i\sigma_z^{i+1}\right) \prod_i \exp\left(-i\frac{\delta}{M}\Gamma_i\sigma_x^i\right) \right)^M,$$

allows to implement the global propagator $U_\delta$ using a sequence of local operations. These consist of z- and x-rotations in addition to nearest-neighbor CNOT gates to compute the parity (before the z-rotation and again after the z-rotation to uncompute the parity). The rotation angles are $$\theta_z = 2\frac{\delta}{M} J_{i,i+1} \text{ and } \theta_x = -2\frac{\delta}{M}\Gamma_i$$

for z- and x-rotations, respectively. The extra factor of two arises from the definitions of the Rz and Rx gates.

In order to apply error correction to run the resulting circuit on actual hardware, these rotations can be decomposed into a sequence of Clifford+T gates using rotation synthesis. Such a discrete approximation up to an accuracy of $\varepsilon_R$ features $\mathcal{O}(\log \varepsilon_R^{-1})$ T-gates, where even the constants hidden in the $\mathcal{O}$ notation were explicitly determined.

The first compilation step is to resolve the QPE library call. In this example, the cost of QPE applied to a general propagator U is $$C(QPE_U, \varepsilon_U) = \frac{16\pi}{\varepsilon_{QPE} C({}^CU, \varepsilon_U)},$$

where ${}^CU$ denotes the controlled version of the unitary U, i.e., $({}^CU := 00\otimes 1 + 11 \otimes U).$ Furthermore, the chosen tolerances must satisfy $$\frac{16\pi}{\varepsilon_{QPE}\varepsilon_U} \leq \varepsilon - \varepsilon_{QPE}.$$

The next step, in this example, is to approximate the propagator using a Trotter decomposition. Depending on the order of the Trotter formula being used, this yields $$C({}^CU, \varepsilon_U) = M(\varepsilon_{Trotter})(C({}^CU_1, \varepsilon_{U_1}) + C({}^CU_2, \varepsilon_{U_2})) \text{ with}$$

$$M(\varepsilon_{Trotter})(\varepsilon_{U_1} + \varepsilon_{U_2}) \leq \varepsilon_U - \varepsilon_{Trotter}.$$

In the experiments section, $$M(\varepsilon_{Trotter}) \propto \frac{1}{\sqrt{\varepsilon_{Trotter}}}$$

is chosen as an example. Finally, approximating the (controlled) rotations in ${}^CU_1$ and ${}^CU_2$ by employing rotation synthesis, $$C({}^CU_i, \varepsilon_{U_i}) = 2N \cdot 4 \log \varepsilon_R^{-1}$$

with $2N\varepsilon_R \leq \varepsilon_{U_i}$ for $i \in \{1,2\}$.

Collecting all of these terms and using that $C({}^CU_1, \cdot) = C({}^CU_2, \cdot)$ yields $$C(QPE_U, \varepsilon) = \frac{16\pi}{\varepsilon_{QPE} M(\varepsilon_{Trotter}) \cdot 2 \cdot 2N \cdot 4 \log \varepsilon_R^{-1}} \text{ with}$$

$$\varepsilon_{QPE} + \frac{16h}{\varepsilon_{QPE}(2M(\varepsilon_{Trotter})2N\varepsilon_R + \varepsilon_{Trotter})} \leq \varepsilon.$$

Next, the implementation details and numerical results of the example error management module are described. While the optimization procedure becomes harder for fine-grained cost and error analysis, the benefits in terms of the cost of the resulting circuit are substantial.

A two-mode annealing procedure for optimization is described, in which two objective functions are reduced as follows: The first mode is active whenever the current overall error is larger than the target accuracy ε. In this case, it performs annealing until the target accuracy has been reached. At this point, the second mode becomes active. It performs annealing-based optimization to reduce the circuit cost function. After each such step, it switches back to the error-reduction subroutine if the overall error increased above ε.

Both annealing-based optimization modes follow the same scheme, which consists of increasing/decreasing a randomly chosen $\varepsilon_i$ by multiplying/dividing it by a random factor $f \in (1, 1+\delta]$, where $\delta$ can be tuned to achieve an acceptance rate of roughly 50%. Then, the new objective function value is determined, followed by either a rejection of the proposed change in $\varepsilon_i$ or an acceptance with probability $$p_{accept} = \min(1, e^{-\beta \Delta E}),$$

where $\beta = T^{-1}$ and T denotes the annealing temperature. This means, in particular, that moves which do not increase the energy, i.e., $\Delta E \leq 0$ are always accepted. The pseudo-code of this algorithm can be found in Table 2 provided later.

Using the example of a transverse-field Ising model which was described earlier, the benefits of the error management module are determined by running two experiments. The first aims to assess the difference between a feasible solution, i.e., values $\varepsilon_i$ which produce an overall error that is less than the user-defined tolerance, and an optimized feasible solution. In the first case, the first mode is run only until a feasible solution is obtained and in the latter, both modes are employed, as outlined above.

Figure 6:
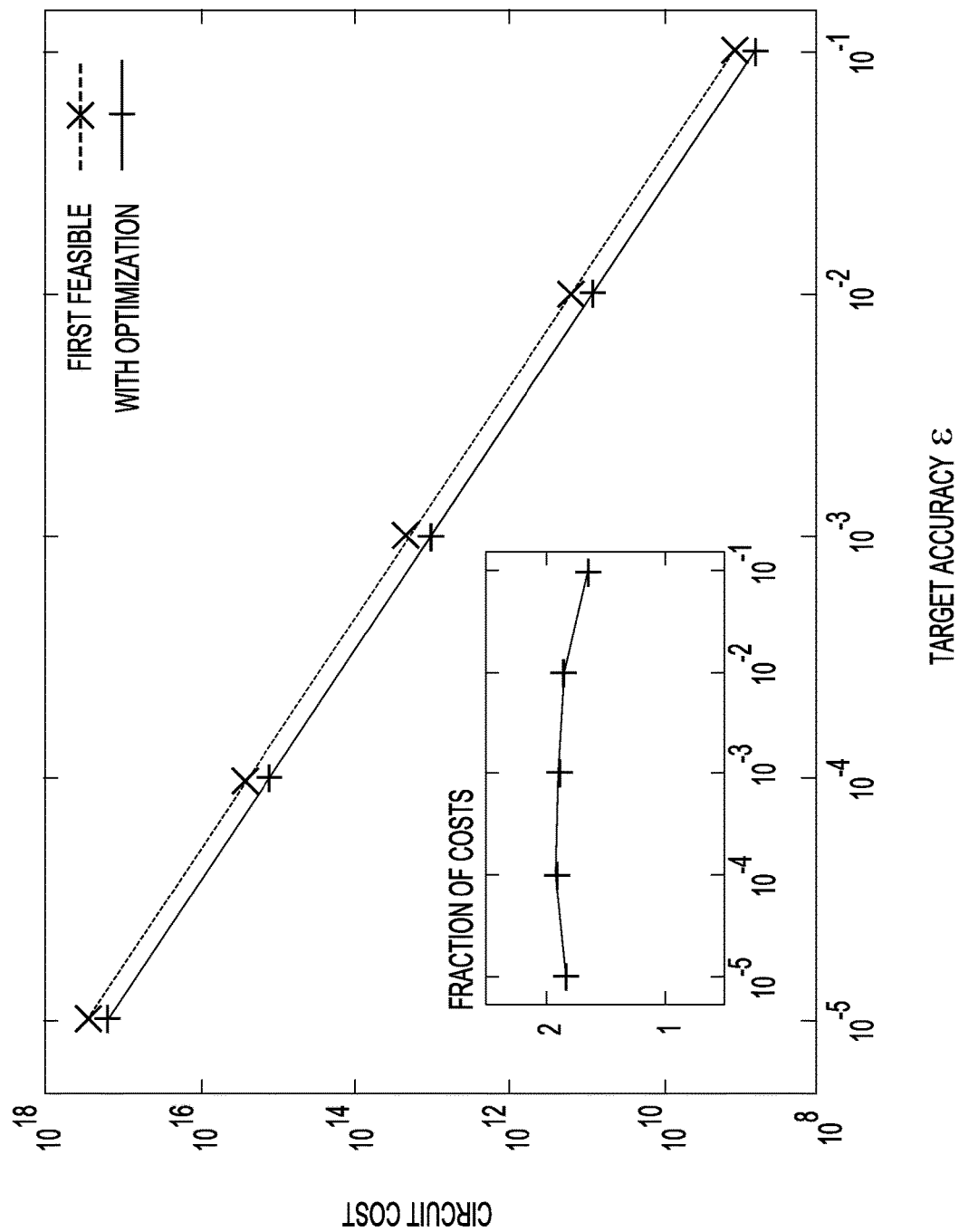
FIG. 6 depicts the costs of the resulting circuit as a function of the desired overall accuracy ε in accordance with one example.

FIG. 6 shows numerical results for the optimization problem resulting from the transverse-field Ising model example. FIG. 6 shows the relationship between the circuit cost (along y-axis) for implementing the quantum algorithm and the target accuracy ε. As shown, the circuit cost goes up with increasing target accuracy. One curve shows the circuit cost prior to optimization and the second curve shows the circuit cost after optimization. Improving the first encountered feasible solution by further optimization allows the reduction of the cost metric M by almost a factor of two (see inset in FIG. 6). By optimizing using additional parameters, the cost metric M can be reduced by several orders of magnitude.

Figure 7:
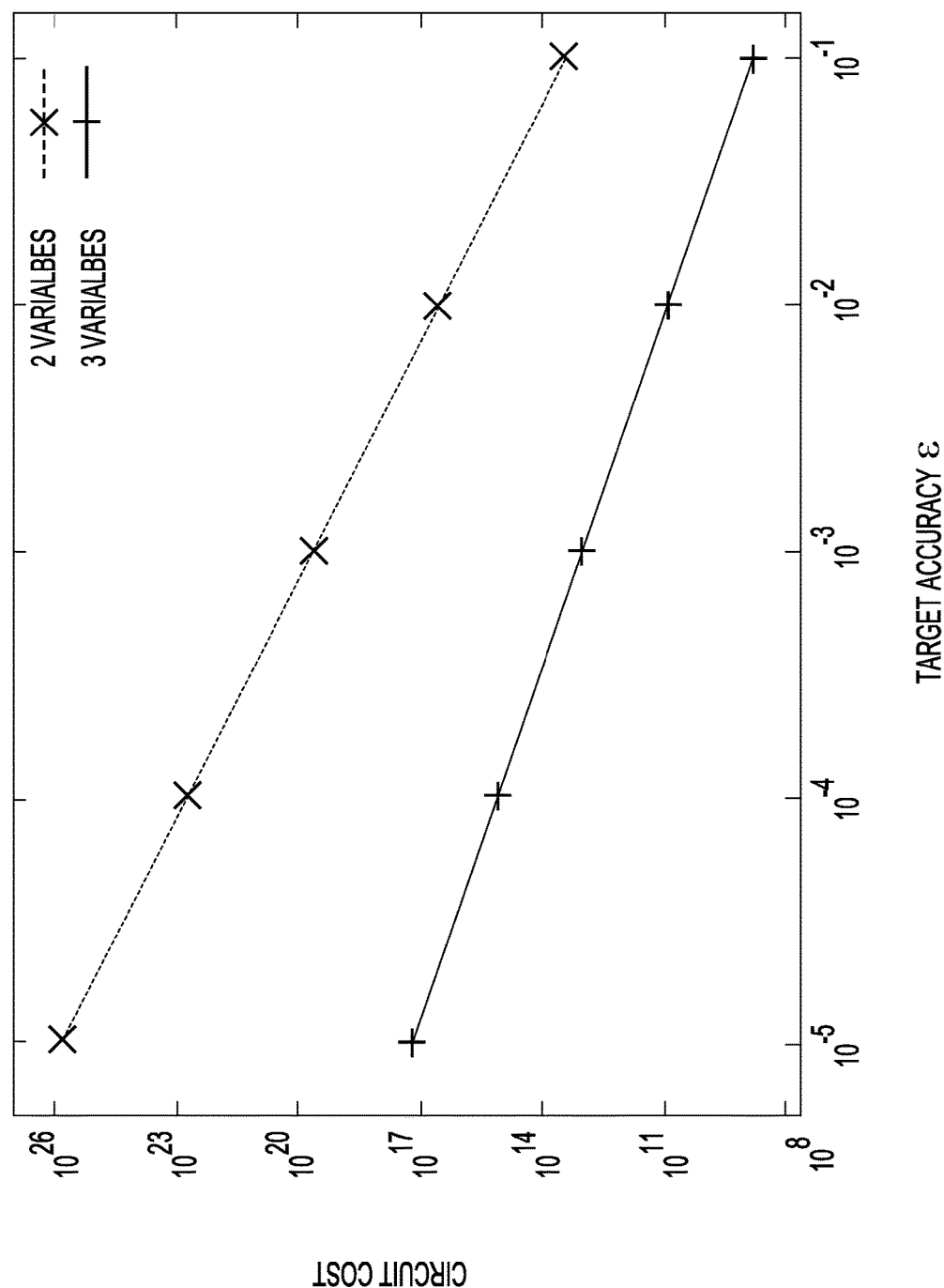
FIG. 7 shows the difference between the circuit costs when using just two such parameters (e.g., setting $\epsilon_R = \epsilon_{Trotter}$) versus using all three parameters in accordance with one example.

FIG. 7 shows an example of the improvement of the first encountered feasible solution shown in FIG. 6. In this example, the circuit costs from performing two-variables based optimization versus three-variables based optimization are shown.

Finally, the robustness of the optimization procedure by introducing redundant parameters, i.e., additional rotation gate synthesis tolerances $\varepsilon_{R_i}$, where the optimal choice would be $\varepsilon_R = \varepsilon_{R_i} = \varepsilon_{R_j}$ for all i, j, is measured. However, because the resulting optimization problem features more parameters, it is harder to solve, and the final circuit cost is expected to be higher.

Figure 8:
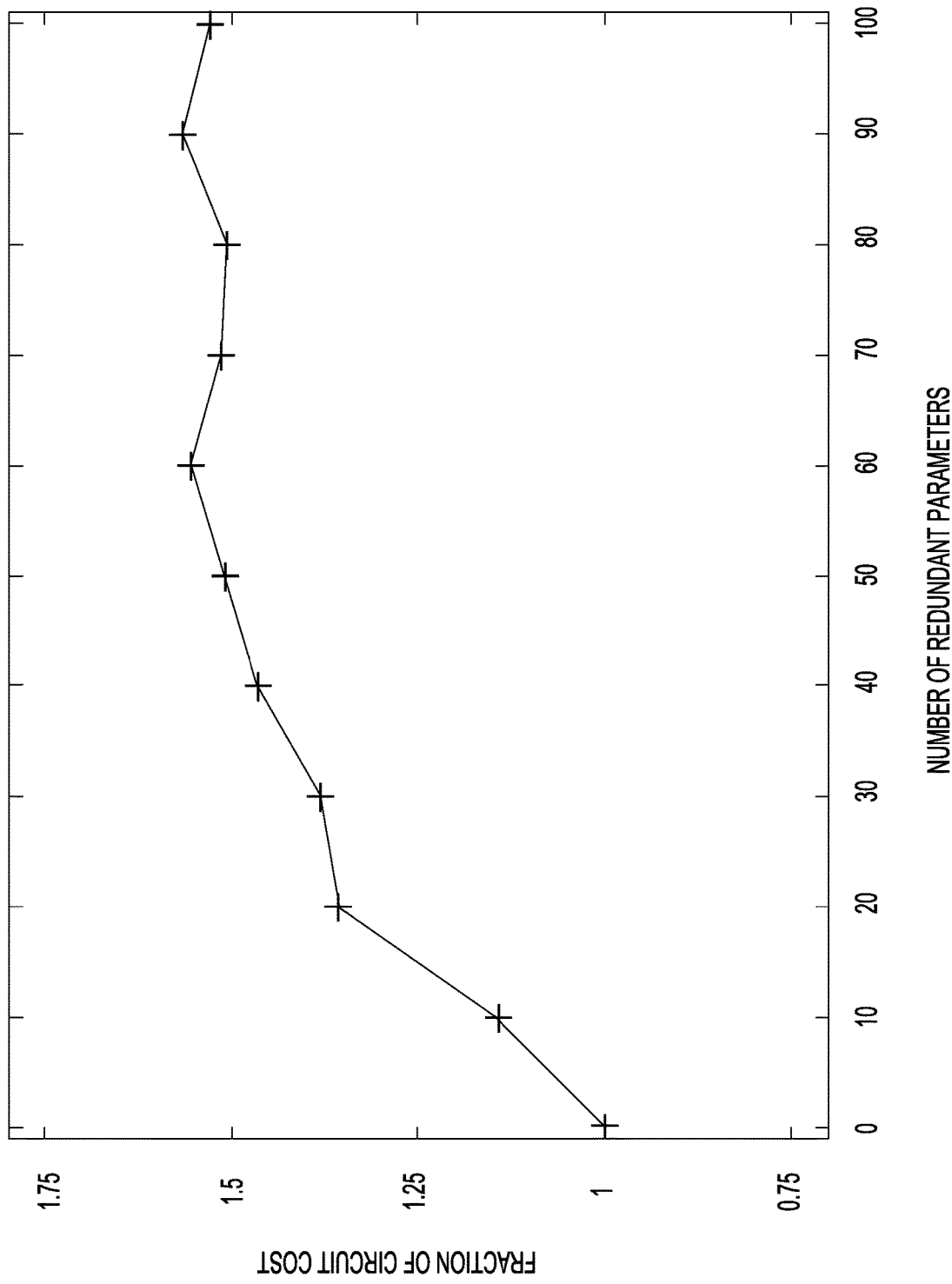
FIG. 8 shows an example of the increase in the fraction of the circuit cost as the number of parameters used for optimization grows.
Figure 9:
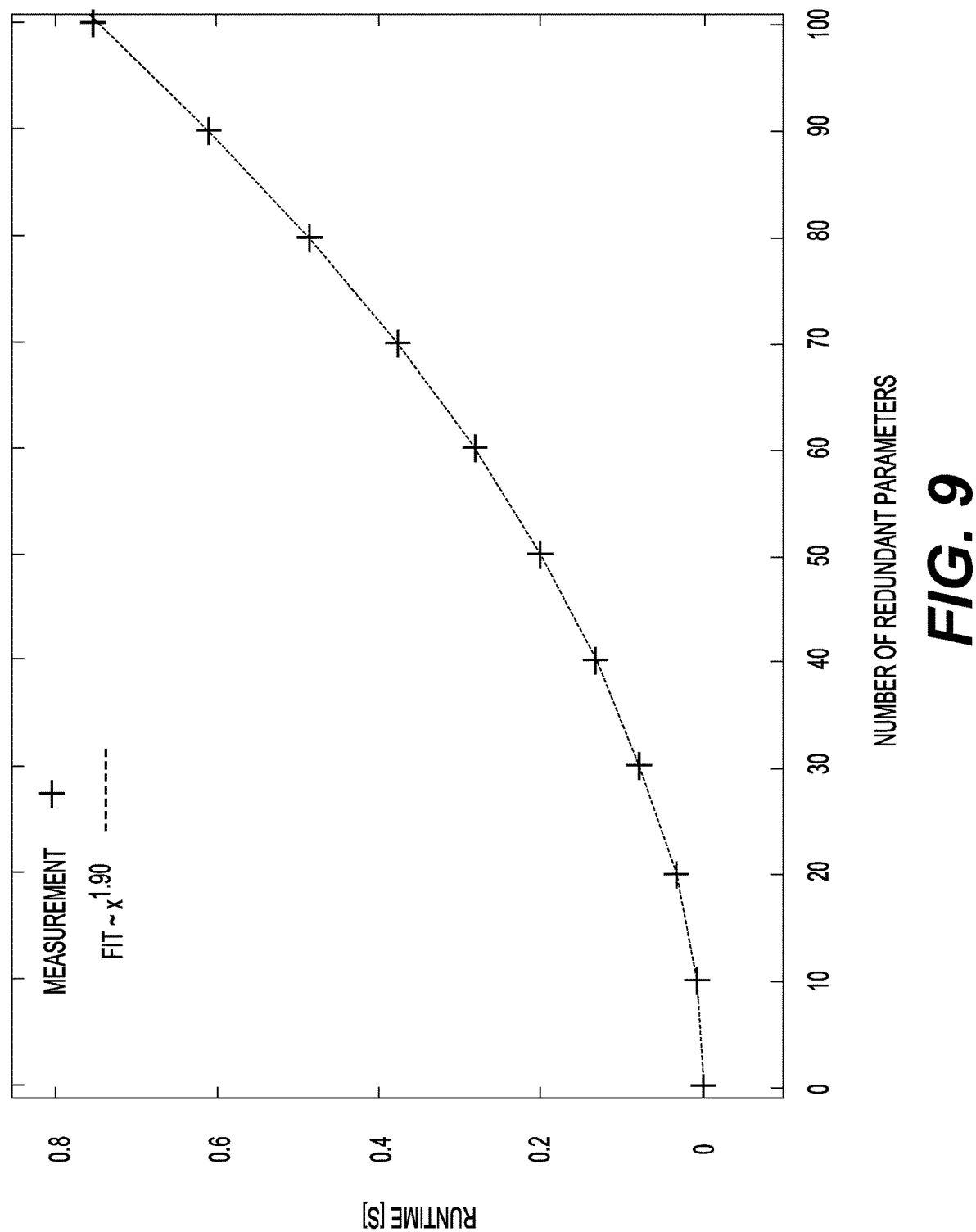
FIG. 9 shows an example of how the runtime for the annealing procedure increases with an increase in the number of redundant parameters used.

In addition, the time it takes to find an initial feasible solution will grow as well. As an example, FIGS. 8 and 9 show results which indicate that this approach is scalable to hundreds of variables if the goal is to find a feasible solution. However, as the number of parameters grows, it becomes increasingly harder to simultaneously optimize for the cost of the circuit. This could be observed, e.g., with 100 additional (redundant) parameters, where further optimization of the feasible solution reduced the cost from $1.65908 \cdot 10^{12}$ to $1.10752 \cdot 10^{12}$, which is far from the almost 2× improvement which was observed for smaller systems in FIGS. 6 and 7.

FIG. 8 shows an example of the increase in the fraction of the circuit cost as the number of parameters used for optimization grows. The fraction of the circuit cost is the circuit cost with a number of redundant parameters divided by the cost achieved with no redundant parameters. In this example, the annealing time was chosen to be 10 throughout, and the annealing procedure was run with 1000 different random number generator seeds, reporting the best result out of the 1000 runs. As illustrated in FIG. 8, the problem becomes harder to optimize as more parameters are added.

FIG. 9 shows an example of how the runtime for the annealing procedure increases with an increase in the number of redundant parameters used. In this example, the annealing time was chosen to be 10 throughout, and the annealing procedure was run with 1000 different random number generator seeds, reporting the best result out of the 1000 runs. The scaling of the runtime in FIG. 9 can be explained since new updates are proposed by selecting i ∈ [0, . . . , N−1] uniformly at random (followed by either increasing or decreasing $\varepsilon_i$). Due to this random walk over i ∈ [0, . . . , N−1], the overall runtime is also expected to behave like the expected runtime of a random walk and, therefore, to be in $\mathcal{O}(N^2)$.

Figure 10:
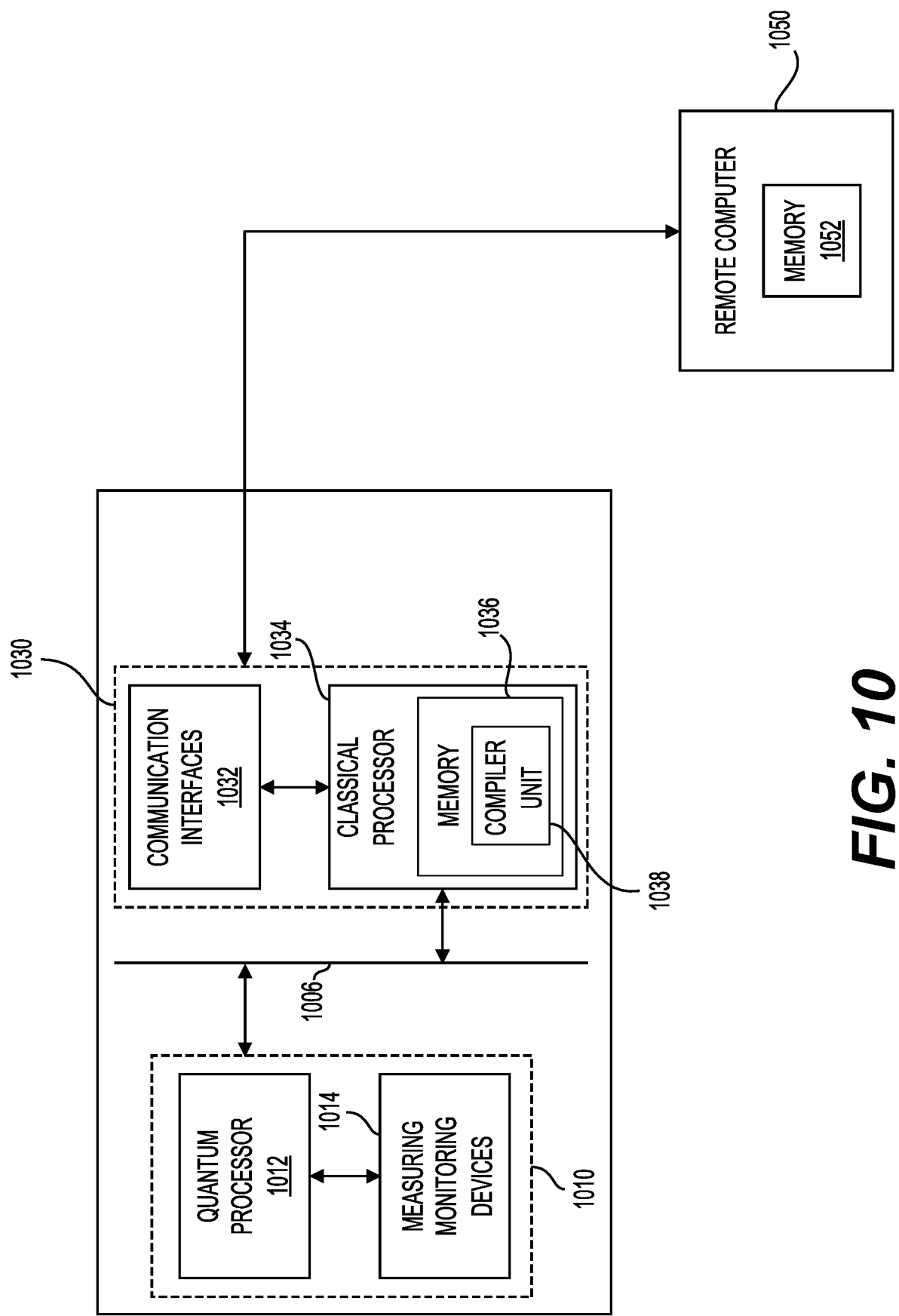
FIG. 10 shows an example system environment for implementing aspects of the components and the methods related to generating quantum computer circuits by distributing approximation errors.

FIG. 10 shows an example system environment for implementing aspects of the technology and the methods described in the present disclosure. System environment includes a quantum computing system 1010 and a classical computing system 1030, which is coupled to a remote computer 1050. Quantum computing system 1010 consumes the quantum circuits generated using the classical computing system 1030. Quantum computing system 1010 may include a quantum processor 1012 and measuring/monitoring devices 1014. In one example, quantum processor 1012 and measuring/monitoring devices 1014 may be configured to operate in a cryogenic environment (e.g., between 4 Kelvin and 77 Kelvin) such that quantum processor may perform superconducting operations. Quantum processor 1012 may execute quantum circuits that are compiled by classical computing system 1030. The compiled quantum circuits may be communicated to quantum processor 1012 via bus 1006.

With continued reference to FIG. 9, classical computing system 1030 may include communication interface(s) 1032, classical processor 1034, and memory 1036. Memory 1036 may include a compiler unit 1038, including libraries and other programs or code to compile a high-level description of a quantum algorithm into quantum circuits. Compiler unit 1038 may further include programs or code to execute the steps described with respect to FIG. 1. Thus, compiler unit 1038 may include programs or code that when executed by classical processor 1034 may perform the various methods described with respect to the present disclosure. In one example, the code shown in Table 2 below may be stored in memory 1036 either as part of compiler unit 1038 or separately. The high-level description of the quantum algorithm may be stored in memory 1036 or in memory 1052, which is associated with remote computer 1050.

TABLE 2

```
/* Finds approximations to the solution(s) of the constraint
optimization problem min J(x) such that E(x) <= E0 using
simulated annealing. The coded example is three-dimensional
(i.e., x \in R^3). */
#include<iostream>
#include<cstdlib>
#include<cmath>
#include<vector>
#include<random>
using namespace std;
int main(int argc, char *argv[ ]){
    double beta_0 = 0.; // initial inverse temperature
    double M = 0; // ~ number of steps
    double goal_E = 0.01; // desired accuracy of the overall algorithm
    if (argc > 1)
        goal_E = atof(argv[1]); // first argument is desired accuracy
        (if provided)
    unsigned num_var = 3;
    if (argc > 2)
        num_var = atoi(argv[2]);
    if (argc > 3)
        M = atof(argv[3]);
    // EXAMPLE: Transverse-field Ising Model
    vector<long double> eps(num_var, 1.e-4); // initial values
    double N = 10.; // ~ number of spins in TFIM
    // functions returning the number of gates and the error for given
    epsilon
    auto J = [&]( ){
        double loge = 0.;
        for (unsigned i = 2; i < eps.size( ); ++i)
            loge += log2(1/eps[i]);
        loge /= eps.size( )-2;
        return 4*M_PI/eps[0] * 2*N/sqrt(eps[1])*2*N*4*loge;
    };
    auto E = [&]( ){
        double e = 0.;
        for (unsigned i = 2; i < eps.size( ); ++i)
            e += eps[i];
        e /= eps.size( )-2;
        return eps[0] + 4*M_PI/eps[0]*(2*N/sqrt(eps[1])*2*N*e+eps[1]);
    };
    long accept = 0, total = 0;
    vector<long double> best_eps; // keep track of the best values
    double lowest_J = 1./0., best_E, best_beta; // same here
    for (unsigned seed = 0; seed < ((M > 1)?1000:1) ; ++seed){
        // RUN annealing:
        double beta = beta_0; // inverse temperature for annealing
        bool error = true; // if true, annealing reduces error; if false it reduces
gate count
        unsigned k = 0; // helper variable keeping track of the number of mode
changes
        auto f_dec = - 0.08;
        auto f_inc = + 0.08;
        std::mt19937 mt(seed);
        std::uniform_real_distribution<double> dist(0., 1.);
        auto rng = [&]( ){ return dist(mt); };
        unsigned r = 0;
        while (E( ) > goal_E || beta < 10.){
            auto oldE = E( );
            double current_J = J( );
            auto P = rng( );
            auto Q = rng( );
            auto old_eps = eps;
            eps[int(eps.size( ) * P)] *= 1 +
            ((Q < 0.5)?f_dec:f_inc) * (1-rng( ));
            if (!error){
                double dJ = J( ) - current_J;
                total++;
                if (dJ > 0 && exp(-dJ * beta) < rng( ))
                    eps = old_eps;
                else
                    accept++;
            }
            else{
                auto dE = (E( ) - oldE) / goal_E;
                double dJ = J( ) - current_J;
                if (dE > 0 && exp(-dE * beta) < rng( ))
                    eps = old_eps;
            }
```

TABLE 2-continued

```
            // switch mode depending on the current error
            if (E( ) > goal_E && !error)
                error = true; // --> algorithm will try to reduce error
            if (E( ) <= goal_E && error){
                error = false; // --> algorithm will try to reduce gate count
                /*beta /= M / ++k; // update annealing parameter
                if (beta < beta_0) // annealing processes, iteratively reducing
errors followed
                    beta = beta_0; // by reducing gates*/
            }
            if (J( ) <= lowest_J && E( ) <= goal_E){ // keep track of
best values
                lowest_J = J( );
                best_E = E( );
                best_eps = eps;
                best_beta = beta;
            }
            beta += 1./M;
        }
    }
    // output best values//
/* Finds approximations to the solution(s) of the constraint optimization
problem min J(x) s.t. E(x) <= E0 using thermal annealing. The coded
example is three-dimensional (i.e., x \in R^3). */
#include<iostream>
#include<cstdlib>
#include<cmath>
#include<vector>
#include<random>
using namespace std;
int main(int argc, char *argv[ ]){
    double beta_0 = 0.; // initial inverse temperature
    double M = 0; // ~ number of steps
    double goal_E = 0.01; // desired accuracy of the overall algorithm
    if (argc > 1)
        goal_E = atof(argv[1]); // first argument is desired accuracy
        (if provided)
    unsigned num_var = 3;
    if (argc > 2)
        num_var = atoi(argv[2]);
    if (argc > 3)
        M = atof(argv[3]);
    // EXAMPLE: Transverse-field Ising Model:
    vector<long double> eps(num_var, 1.e-4); // initial values
    double N = 10.; // ~ number of spins in TFIM
    // functions returning the number of gates and the error for given
    epsilon
    auto J = [&]( ){ return 16*M_PI/eps[0] *
2*N/sqrt(eps[1])*2*N*4*log2(1/eps[eps.size( )-1]); };
    auto E = [&]( ){ return eps[0] +
16*M_PI/eps[0]*(2*N/sqrt(eps[1])*2*N*eps[eps.size( )-1]+eps[1]); };
    long accept = 0, total = 0;
    vector<long double> best_eps; // keep track of the best values
    double lowest_J = 1./0., best_E, best_beta; // same here
    for (unsigned seed = 0; seed < ((M > 1)?1000:1) ; ++seed){
        // RUN annealing:
        double beta = beta_0; // inverse temperature for annealing
        bool error = true; // if true, annealing reduces error; if false it
reduces gate count
        unsigned k = 0; // helper variable keeping track of the number of
mode changes
        auto f_dec = - 0.08;
        auto f_inc = + 0.08;
        std::mt19937 mt(seed);
        std::uniform_real_distribution<double> dist(0., 1.);
        auto rng = [&]( ){ return dist(mt); };
        unsigned r = 0;
        while (E( ) > goal_E || beta < 10.){
            auto oldE = E( );
            double current_J = J( );
            auto P = rng( );
            auto Q = rng( );
            auto old_eps = eps;
            eps[int(eps.size( ) * P)] *= 1 +
            ((Q < 0.5)?f_dec:f_inc) * (1-rng( ));
            if (!error){
                double dJ = J( ) - current_J;
                total++;
                if (dJ > 0 && exp(-dJ * beta) < rng( ))
                    eps = old_eps;
                else
```

TABLE 2-continued

```
            accept++;
        }
        else{
            auto dE = (E( ) – oldE) / goal_E;
            double dJ = J( ) – current_J;
            if (dE > 0 && exp(–dE * beta) < rng( ))
                eps = old_eps;
        }
        // switch mode depending on the current error
        if (E( ) > goal_E && !error)
            error = true; // --> algorithm will try to reduce error
        if (E( ) <= goal_E && error){
            error = false; // --> algorithm will try to reduce gate count
            /*beta /= M / ++k; // update annealing parameter: we perform multiple
            if (beta < beta_0) // annealing processes, iteratively reducing errors followed
                beta = beta_0; // by reducing gates*/
        }
        if (J( ) <= lowest_J && E( ) <= goal_E){ // keep track of best values
            lowest_J = J( );
            best_E = E( );
            best_eps = eps;
            best_beta = beta;
        }
        beta += 1./M;
    }
}
// output best values
cout << "\rBEST: " << lowest_J << " : err = " << best_E << " eps[ ] = {";
for (auto e : best_eps)
    cout << e << " ";
cout << "}\nat beta = " << best_beta << "\n";
cout << "Acceptance = " << accept/(double)total*100 <<"%.\n";
}
```

In conclusion, the present disclosure relates to a method for decomposing a quantum algorithm into quantum circuits. The method may include using at least one processor, automatically performing a step-wise decomposition of the quantum algorithm until the quantum algorithm is fully decomposed into the quantum circuits, where the automatically performing the step-wise decomposition results in a set of approximation errors and a set of parameters to instantiate at least a subset of the quantum circuits corresponding to the quantum algorithm, such that an overall approximation error caused by the automatically performing the step-wise decomposition is maintained below a specified threshold approximation error.

Each of the quantum circuits may be a gate that can be implemented using a quantum processor. Each of the quantum circuits may be a fault-tolerant logical gate. Each of the quantum circuits may be implemented as a protected operation on encoded quantum data.

The method may further comprise using an optimization problem minimizing a cost metric associated with implementing the quantum circuits while maintaining the overall approximation error below the specified threshold approximation error. The optimization problem may encode a condition to meet the overall approximation error and a condition to minimize the cost metric associated with the quantum circuits. The optimization problem may be solved using a heuristic method to select parameters of the quantum circuits. The optimization problem may be solved by choosing a random initial assignment of approximation errors and parameters. The solution to the optimization problem may be computed using simulated annealing.

In another example, the present disclosure relates to a method for decomposing a quantum algorithm into quantum circuits. The method may include using at least one processor, automatically performing a step-wise decomposition of the quantum algorithm and distributing an overall approximation error caused by the automatically performing the step-wise decomposition into subroutines until the quantum algorithm is fully decomposed into the quantum circuits. The method may further include using the at least one processor, minimizing a cost metric associated with implementing the quantum circuits while maintaining the overall approximation error below a specified threshold approximation error.

Each of the quantum circuits may be implemented as a protected operation on encoded quantum data.

The minimizing the cost metric may further comprise solving an optimization problem using a heuristic method to select parameters of the quantum circuits. The optimization problem may be solved by choosing a random initial assignment of approximation errors and parameters.

In yet another example, the present disclosure relates to a computer-readable medium comprising computer executable instructions for a method. The method may include using at least one processor, automatically performing a step-wise decomposition of the quantum algorithm and distributing an overall approximation error caused by the automatically performing the step-wise decomposition into subroutines until the quantum algorithm is fully decomposed into the quantum circuits, where the step-wise decomposition into the subroutines is implemented via a quantum phase estimation (QPE) process. The method may further include using the at least one processor, minimizing a cost metric associated with implementing the quantum circuits while maintaining the overall approximation error below a specified threshold approximation error.

The QPE process may implement a time evolution of an Ising model in a transverse field. The QPE process may be applied to a task of evolving a quantum-mechanical system that is initialized in a given state for a specified total duration of time. The total duration of time may be divided into subintervals. The total duration of time may be divided into subintervals using Trotter method or Trotter-Suzuki method. The total duration of time may be divided into subintervals using a Linear Combination of Unitaries (LCU) method. The LCU method may be implemented using state preparation circuits.

It is to be understood that the methods, modules, and components depicted herein are merely exemplary. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory, such as, DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method for decomposing a quantum algorithm into quantum circuits, the method comprising:
using at least one processor, automatically performing a step-wise decomposition of the quantum algorithm until the quantum algorithm is fully decomposed into the quantum circuits, wherein the automatically performing the step-wise decomposition results in a set of approximation errors and a set of parameters to instantiate at least a subset of the quantum circuits corresponding to the quantum algorithm, such that an overall approximation error caused by the automatically performing the step-wise decomposition is maintained below a specified threshold approximation error.

2. The method of claim 1, wherein each of the quantum circuits is a gate that can be implemented using a quantum processor.

3. The method of claim 1, wherein each of the quantum circuits is a fault-tolerant logical gate.

4. The method of claim 1, wherein each of the quantum circuits is implemented as a protected operation on encoded quantum data.

5. The method of claim 1 further comprising using an optimization problem minimizing a cost metric associated with implementing the quantum circuits while maintaining the overall approximation error below the specified threshold approximation error.

6. The method of claim 5, wherein the optimization problem encodes a condition to meet the overall approximation error and a condition to minimize the cost metric associated with the quantum circuits.

7. The method of claim 6, wherein the optimization problem is solved using a heuristic method to select parameters of the quantum circuits.

8. The method of claim 7, wherein the optimization problem is solved by choosing a random initial assignment of approximation errors and parameters.

9. The method of claim 8, wherein a solution to the optimization problem is computed using simulated annealing.

10. A method for decomposing a quantum algorithm into quantum circuits, the method comprising:
using at least one processor, automatically performing a step-wise decomposition of the quantum algorithm and distributing an overall approximation error caused by the automatically performing the step-wise decomposition into subroutines until the quantum algorithm is fully decomposed into the quantum circuits; and
using the at least one processor, minimizing a cost metric associated with implementing the quantum circuits while maintaining the overall approximation error below a specified threshold approximation error.

11. The method of claim 10, wherein each of the quantum circuits is implemented as a protected operation on encoded quantum data.

12. The method of claim 10, wherein the minimizing the cost metric further comprises solving an optimization problem using a heuristic method to select parameters of the quantum circuits.

13. The method of claim 12, wherein the optimization problem is solved by choosing a random initial assignment of approximation errors and parameters.

14. A computer-readable medium comprising computer executable instructions for a method comprising:
using at least one processor, automatically performing a step-wise decomposition of the quantum algorithm and distributing an overall approximation error caused by the automatically performing the step-wise decomposition into subroutines until the quantum algorithm is fully decomposed into the quantum circuits, wherein the step-wise decomposition into the subroutines is implemented via a quantum phase estimation (QPE) process; and
using the at least one processor, minimizing a cost metric associated with implementing the quantum circuits while maintaining the overall approximation error below a specified threshold approximation error.

15. The computer-readable medium of claim 14, wherein the QPE process implements a time evolution of an Ising model in a transverse field.

16. The computer-readable medium of claim 14, wherein the QPE process is applied to a task of evolving a quantum-mechanical system that is initialized in a given state for a specified total duration of time.

17. The computer-readable medium of claim 16, wherein the total duration of time is divided into subintervals.

18. The computer-readable medium of claim 17, wherein the total duration of time is divided into subintervals using Trotter method or Trotter-Suzuki method.

19. The computer-readable medium of claim 17, wherein the total duration of time is divided into subintervals using a Linear Combination of Unitaries (LCU) method.

20. The computer-readable medium of claim 19, wherein the LCU method is implemented using state preparation circuits.

* * * * *